April 6, 1954

C. H. THAYER 2,674,498

GAS LIFT DISENGAGER

Filed Dec. 29, 1950

INVENTOR.
CLARENCE H. THAYER
BY
Busser and Harding
ATTORNEYS

Patented Apr. 6, 1954

2,674,498

UNITED STATES PATENT OFFICE 2,674,498

GAS LIFT DISENGAGER

Clarence H. Thayer, Wallingford, Pa., assignor to Sun Oil Company, Philadelphia, Pa., a corporation of New Jersey Application December 29, 1950, Serial No. 203,323

4 Claims. (Cl. 302—59)

This invention relates to the elevation of granular solids by means of lifting gas, and more particularly to the disengaging of granular solids from gas after such elevation.

Numerous industrial processes involve the continuous circulation of granular solids through a process system. Frequently in such processes, granular solids gravitate continuously through a reaction zone or zones and then are continuously elevated by means of a lifting gas from a level below the reaction zone or zones to a level thereabove. Upon reaching the higher level, the granular material is disengaged, that is separated, from gas and returned to the reaction zone or zones for gravitation again therethrough. The present invention relates to a novel method and apparatus for effecting such disengaging with a minimum of attrition of granular solids.

So-called moving bed catalytic conversions of hydrocarbon oil are examples of processes wherein granular solids can be elevated from a level below a conversion zone and other reaction zones such as a regeneration zone to a level above the reaction zones by means of a lifting gas, and wherein also it is highly undesirable that the granular solids should undergo excessive attrition.

Elevation of granular solids from an engager vessel to a disengager vessel can be effected through a plurality of lift conduits, each conduit communicating at its lower end with the engager vessel and at its upper end with the disengager vessel. One advantage of such operation is that less attrition of solids frequently is encountered when such a plurality of conduits is used than when a single conduit having the same solids capacity is used.

The present invention provides method and apparatus whereby granular solids are elevated by lifting gas from an engager vessel through a plurality of lift conduits to a disengager vessel in such fashion that the stream of gas and solids which continuously issues from the top of each lift conduit rises to a relatively short distance above the top of the conduit before reversing direction and falling into the part of the disengager below the top of the lift conduit. In this manner, the present invention provides a lower degree of attrition than can be obtained with prior art method and apparatus, and also makes it possible to use shorter disengagers to handle solids at a given rate than can be used with prior art method and apparatus.

The invention will now be described with reference to the attached drawing.

Figure 1:
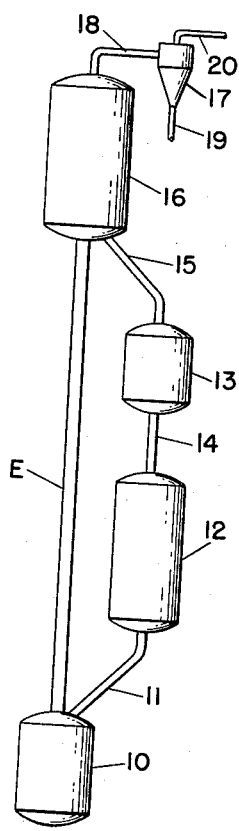
Figure 2:
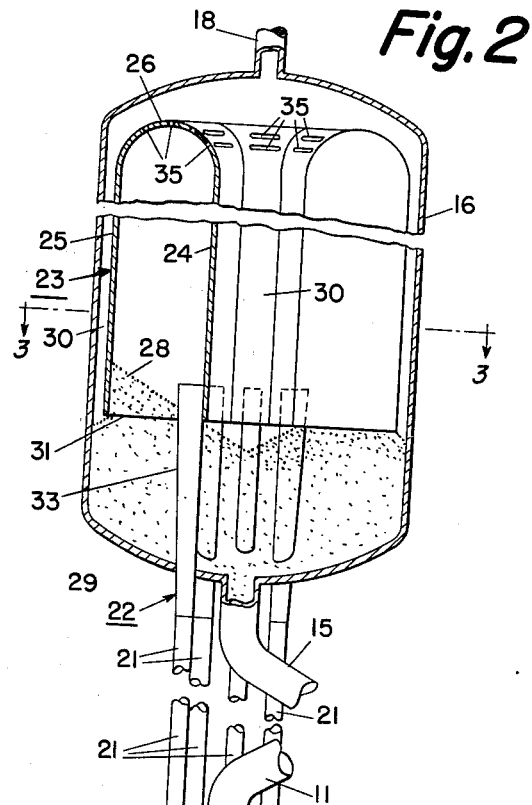
Figure 3:
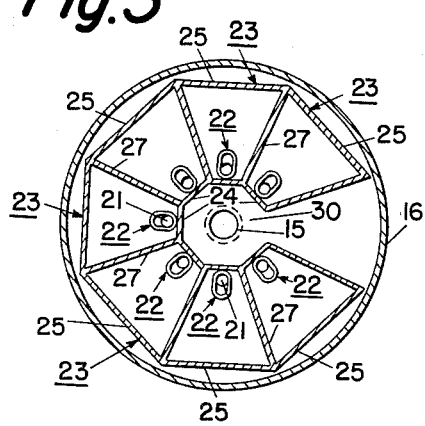

Figure 1 is a diagrammatic view of a process system through which granular solids are continuously circulated, gravitating through reaction zones and being elevated by means of a lifting gas from a level below the reaction zones to a disengaging vessel above the reaction zones. Figure 2 is an elevational view showing engager, disengager, and a plurality of lift conduits, the disengager being shown in section to illustrate the novel features of the invention. Figure 3 is a sectional plan view of the disengager.

Referring to Figure 1, 10 indicates the engager which receives catalyst or contact material by gravity through line 11 from a reaction zone such as a regenerator 12 positioned below an upper reaction zone 13 which is in communication with zone 12 through line 14 and which receives contact material by gravity continuously through line 15 from a disengager 16. Means for elevating the contact material from the engager 10 to the disengager 16 are shown generally at E. Separating means such as a cyclone separator 17 are in communication with disengager 16 through line 18 and fines are removed by the separator through line 19 while the lifting medium is removed from the separator 17 through line 20. Figure 1 does not show any details of the present invention and is provided only to show the general arrangement of a system wherein catalyst or contact material is utilized in the form of a continuously moving mass.

Referring to Figure 2 which shows details of the present invention, a plurality of conduits 21 are utilized for elevating granular material from the engager 10 to the disengager 16. The number and cross-sectional area of the elevating conduits are determined in accordance with the rates of catalyst circulation which are desired in the system. The lower ends of the conduits 21 are in communication with the engager 10 while the upper ends of the conduits 21 are in communication with expanding conduits 22 which in turn communicate with the disengager 16. The expanding conduits 22 constitute continuations of the conduits 21, which continuations provide, instead of the substantially constant cross-sections of conduits 21, cross-sections which gradually upwardly increase through an increase in one direction of the cross-section of each expanding conduit 22.

Means are provided adjacent the lower ends of the conduits 21 to effectively start the lifting operation through each of the conduits independently. These can be any suitable means, such as those disclosed in my copending applications Serial Nos. 190,728 and 191,641, filed October 18, 1950, and October 23, 1950, respectively.

The outlet ends of the expanding conduits 22 extend through the lower end of the upper vessel or disengager 16 and are positioned a short distance within the lower portion of the disengager. A plurality of upper compartments 23 having lower open ends 31 are disposed within the disengager 16. One compartment is provided to cooperate with each lift conduit and the upper ends of the conduits 22 extend a short distance into the compartments. Each compartment is provided with an upper end 26 which is preferably spaced from the top of the disengager 16. The upper ends 26 of the compartments have slots 35 therein and the lifting gas passes upwardly out of disengaging chamber 23 through slots 35 and thence from disengager 16 through outlet 18. It is to be understood, however, that according to the invention the upper ends of the compartments can be closed and the mixture of contact material and lifting gas directed in reverse flow through the outlet ends 31 of the compartments into the lower end of the disengager 16 from which the contact material is removed through line 15 and directed to the conversion zone 13 as described in connection with Figure 1; the lifting medium can then pass downwardly in reverse flow from the compartments, then upwardly between the compartments and between the compartments and the wall of the disengager 16 and finally pass from disengager 16 through outlet 18.

Each expanding conduit 22 is eccentrically positioned with relation to the disengaging chamber 23 with which it communicates; that is, each conduit 22 is adjacent a sidewall 24 of disengaging chamber 23. Each expanding conduit 22 is eccentrically upwardly tapered; that is, it gradually upwardly increases in dimension in only one direction, namely toward sidewall 25 of disengaging chamber 23, which sidewall 25 is opposite the sidewall 24. In operation, sidewall 24 and the eccentric taper of expanding conduit 22 urge the rising stream of gas and solids toward sidewall 25, so that the stream approaches more closely to sidewall 25 than it would in the absence of the eccentric taper and of sidewall 24. The sidewall 24 provides a substantially vertical baffle preventing expansion of the rising gas stream away from sidewall 25, so that the rising gas stream must expand toward sidewall 25; this serves in effect to urge the rising stream of gas and solids toward sidewall 25. The sidewalls 27, in operation, inhibit expansion of gas after issuance from one expanding conduit 22 toward the adjacent expanding conduit 22.

In operation, gas passing through expanding conduits 22 undergoes as it rises limited lateral expansion in one direction, that is, toward the sidewalls 25. The expansion is limited by virtue of the fact that the expanding conduits 22 are, though expanding in one dimension, confining conduits, and it is not until after issuance of gas from expanding conduits 22 that the gas can undergo substantially unlimited expansion toward sidewall 25.

Expanding conduit 22 is adjacent a lower portion of sidewall 24 of disengaging chamber 23: conduit 22 can actually be in contact with sidewall 24, as shown in the drawing, or it can be horizontally spaced apart therefrom a short distance, but the horizontal distance between the sidewall 24 and the nearest surface of conduit 22 is preferably not greater than the diameter of lift conduit 21. Sidewall 24 extends a substantial distance above the top of expanding conduit 22 and communicates with disengager top 26, which as shown in Figures 2 and 3 has the shape of a segment of a hemisphere. Disengager top 26 also communicates with opposite sidewall 25 and with connecting sidewalls 27 to provide a space above the top of expanding conduit 22. In operation, this provided space allows gas and solids to rise without striking any transverse rigid obstruction, reverse direction through loss of momentum, and descend toward the bottom of disengaging chamber 23. The solids fall onto the surface of compact bed 28 which collects in the receptacle provided by the bottom 29 of disengager 16. An outlet for gas from disengaging chamber 23 is provided by the communication of compact bed 28 with the gas spaces 30 which in turn communicate with gas outlet 18 for removal of gas from disengager 16. Solids outlet 15 provides means for removing solids from the receptacle provided by bottom 29 of disengager 16.

It is to be understood that in operation the rates of flow of solids respectively through expanding conduit 22 and through outlet 15 can be so regulated that the surface of compact bed 28 is either above, as shown, or beneath the level of the bottom of disengaging chamber 23, in which latter case a gas outlet from disengaging chamber 23 is provided by direct communication of gas spaces 30 with the gas space inside disengaging chamber 23.

The disengaging apparatus as described above is effective to achieve in operation a relatively short height of rise of solids above the tops of the expanding conduits 22. Although I do not wish to be limited to any theory, it is believed that the relatively short height of rise is achieved by virtue of the fact that the top of the expanding portion of the lift conduit is adjacent a sidewall of the disengaging chamber with which it communicates, so that the sidewall in effect urges the solids in a horizontal direction and lessens the vertical component of their rise above the top of the expanding portion of the lift conduit. According to the present invention, the dimensions of the sections of the disengager are advantageously such that, referring to Figure 3, the width of sidewall 24 is about 2½ times the diameter of the lift conduit 21. This provides an advantageous degree of proximity of the conduits 21 to the sidewalls 27, and enables those sidewalls to further urge the rising stream of gas and solids toward sidewall 25, and thus to provide still further decrease in the height of rise. The invention contemplates structures where the width of sidewall 24 is only about equal to the diameter of lift conduit 21. Preferably, the width of sidewall 24 is not more than about three times the diameter of lift conduit 21.

Any suitable horizontal cross-sectional shape of the disengaging chamber can be used, e. g. circular, rectangular, etc. either with single or multiple disengaging chambers. The shapes shown in the drawings have been found to be particularly suitable when a plurality of disengaging chambers is desired, but other shapes can be used.

It is to be understood that instead of conduits 21 having substantially constant cross-section and expanding conduits 22, conduits can be used which expand throughout their entire length from their points of communication with the engager to their points of communication with the disengager. The rate of expansion of the expanding conduits can vary widely; it is preferred that the surface represented as 33 in Figure 2 be inclined at an angle with the vertical within the approximate range 0.1–25 degrees.

As an example of the manner in which decrease in heights of rise can be obtained according to the invention, the following results are presented of experiments wherein the operation of apparatus having the features of the present invention was compared with the operation of apparatus lacking the combination of features of the present invention. The apparatus according to the present invention consisted of a disengaging chamber constructed in the shape of one of the disengager compartments 23 in Figure 2; an 8 inch diameter lift conduit was used having at the top thereof an eccentrically tapered expanding conduit 20 feet in length, the major dimension at the top of that expanding conduit being 9.75 inches; the conduit was eccentrically positioned, as shown in Figure 2, with regard to the disengaging chamber the top of the conduit being in contact with the chamber sidewall; the dimensions of the disengaging chamber's horizontal cross-section were, referring to Figure 3, as follows: sidewall 24, 19.5 inches; sidewall 25, 61.5 inches; sidewalls 27, 47 inches.

Another set of apparatus tested had a lift conduit and expanding conduit, each with the same dimensions as the corresponding conduits in the apparatus according to the invention. The conduits were, however, substantially centrally positioned with regard to the disengaging chamber into which they discharged, so that the horizontal distance from the conduit top of the nearest disengager wall was about 3 feet. The disengaging chamber contained a flat horizontal baffle plate more than 15 feet above the top of the expanding conduit, and above the baffle plate was a top gas drawoff from the chamber.

The two sets of apparatus described above were operated as parts of gas lift systems, each operating at a series of different total rates of lifting gas, but with the other operating conditions being substantially identical for each system and for each run in each system. By plotting for each system of apparatus the height of rise of the solids above the top of the expanding conduit against the total gas rate, it was found that equal heights of rise were obtained at different gas rates in the two systems, the higher gas rate to obtain a given height of rise being observed in the apparatus according to the invention. For example, a twelve foot height of rise was obtained in the two sets of apparatus at the following gas rates in cubic feet (at standard conditions) per minute:

(1) Apparatus according to the invention__ 1270
(2) Apparatus with expanding conduit but no vertical baffle adjacent conduit_____ 1170

Since heights of rise are proportional to gas rates, the above shows that apparatus according to the invention gives a lower height of rise at a given gas rate. For example, at a gas rate of about 1200, apparatus (2) above gives about 13.0 feet height of rise; and apparatus (1) gives about (by slight extrapolation) 9.5 feet height of rise.

The above heights of rise were maximum heights of rise measured to the top of the rising stream of gas and solids, and were determined by visual observation through windows in the apparatus.

The advantages of decreasing, according to the present invention, the height of rise of solids above the top of the lift conduit are advantages which are important in commercial processes. These advantages are described as follows:

By decreasing the height of rise, one decreases the average distance through which granular solids fall from the top of their rise until their fall is arrested, e. g. by hitting, below the top of the lift conduit, the top of a compact bed of solids gravitating through the lower portion of the disengager. By thus decreasing the distance of fall, one decreases the velocity of the solids at the moment their fall is arrested, and consequently decreases the degree of attrition suffered by the solids upon having their fall abruptly arrested. Since attrition is a phenomenon which must be avoided as much as possible if a process is to be economical, the present invention provides an important advantage by decreasing the degree of attrition.

By decreasing the height of rise, one also decreases the height required in the disengager, because less free space is required above the top of the lift conduit. In any disengager, it is important to have sufficient free space that the solids can reverse direction without having, while rising, struck any rigid solid obstruction, and the present invention requires less such free space since the solids do not rise as high.

Apparatus and method according to the invention can be used to elevate granular solids generally, but they are particularly advantageously used with particle-form solid catalysts of the pellet or bead variety such as are commonly used in catalytic conversion of hydrocarbon oil. Such catalysts when freshly made are generally particles having major dimensions between, say, $\tfrac{1}{16}''$ and $\tfrac{3}{4}''$. Method and apparatus according to the invention are particularly effective to prevent excessive attrition of such catalysts.

The invention claimed is:

1. Apparatus for elevating granular solids by means of a lifting gas and for disengaging gas from solids after such elevation which comprises: a plurality of lift conduits horizontally spaced apart around a central area, the tops of said lift conduits being substantially on the same level and being adjacent a substantially vertical partition between said tops of said lift conduits and said central area, each of said lift conduits gradually upwardly expanding away from said central area; a second substantially vertical partition surrounding said tops of said conduits and spaced apart farther than said first-named partition from said conduits, both said partitions extending a substantial distance above the tops of said conduits and constituting sidewalls of a disengaging chamber above said conduits; a transverse partition above said tops of said lift conduits and secured to the upper portions of said substantially vertical partitions and providing beneath said transverse partition a chamber for passage of granular solids; means for removing lifting gas and solids from said chamber; below the tops of said lift conduits a common receptacle for granular solids; and a gas outlet from said disengaging chamber.

2. Apparatus according to claim 1 and additionally comprising partitions between adjacent conduits, said partitions extending from said first-named partitions to the second-named partitions and forming separate disengaging chambers for each conduit.

3. Apparatus for elevating granular solids by means of a lifting gas and for disengaging gas from solids after such elevation which comprises: a plurality of substantially vertical lift conduits horizontally spaced apart around a central area and having their outlet ends on substantially the same level, each conduit gradually upwardly expanding, in an uppermost portion thereof, away from said central area; a disengaging vessel communicating with said outlet ends of said lift conduits, and having its sidewall substantially spaced apart from said outlet ends of said lift conduits; within said disengaging vessel, a plurality of substantially vertical partitions, dividing said disengaging vessel into a plurality of compartments, one for each of said lift conduits, each partition having at least a portion thereof extending upwardly from the level of the outlet ends of said lift conduits; and means for removing lifting gas and solids from said disengaging vessel.

4. Apparatus according to claim 3 wherein the centers of said outlet ends of said lift conduits lie in an imaginary circle surrounding said central area, and wherein said vertical partitions extend radially toward the longitudinal axis of said disengaging vessel.

References Cited in the file of this patent

UNITED STATES PATENTS

| Number | Name | Date |
|---|---|---|
| 1,498,630 | Jensen | June 24, 1924 |

FOREIGN PATENTS

| Number | Country | Date |
|---|---|---|
| 79,550 | Austria | June 15, 1919 |
| 180,397 | Great Britain | May 11, 1922 |